US009246886B2

(12) United States Patent
Hueber et al.

(10) Patent No.: US 9,246,886 B2
(45) Date of Patent: Jan. 26, 2016

(54) DEVICE FOR AND METHOD OF HANDLING SENSITIVE DATA

(71) Applicant: NOVOMATIC AG, Gumpoldskirchen (AT)

(72) Inventors: Andreas Hueber, Gumpoldskirchen (AT); Gerhard Nagl, Gumpoldskirchen (AT); Robert Nowak, Gumpoldskirchen (AT); Igor Mudry, Gumpoldskirchen (AT)

(73) Assignee: Novamatic AG, Gumpoldskirchen (AT)

( * ) Notice: Subject to any disclaimer, the term of this patent is extended or adjusted under 35 U.S.C. 154(b) by 0 days.

(21) Appl. No.: 13/908,890

(22) Filed: Jun. 3, 2013

(65) Prior Publication Data

US 2013/0339739 A1    Dec. 19, 2013

Related U.S. Application Data

(63) Continuation of application No. PCT/EP2011/006059, filed on Dec. 2, 2011.

(30) Foreign Application Priority Data

Dec. 3, 2010 (EP) .................................... 10015270

(51) Int. Cl.
*H04L 29/06* (2006.01)
*G06F 21/00* (2013.01)
(Continued)

(52) U.S. Cl.
CPC ............ *H04L 63/0435* (2013.01); *G06F 21/72* (2013.01); *G06F 21/85* (2013.01)

(58) Field of Classification Search
CPC ..... H04L 29/06; H04L 63/0435; G06F 21/72; G06F 21/85
See application file for complete search history.

(56) References Cited

U.S. PATENT DOCUMENTS

| 6,209,098 | B1 * | 3/2001 | Davis ............................ 713/194 |
| 6,735,693 | B1 * | 5/2004 | Hamlin ......................... 713/168 |
| 7,395,165 | B2 * | 7/2008 | Buhr ............................. 702/108 |

(Continued)

FOREIGN PATENT DOCUMENTS

EP    1085420    3/2001

OTHER PUBLICATIONS (IEEE Snapshot).*

(Continued)

*Primary Examiner* — Michael Pyzocha
(74) *Attorney, Agent, or Firm* — Levine Bagade Han LLP

(57) ABSTRACT

A device for handling sensitive data comprises a first integrated circuitry forming a first trust zone and a second integrated circuitry forming a second trust zone. The first circuitry comprises a secure processing unit adapted for processing sensitive data, the second circuitry comprises a persistent memory area within its trust zone for storing sensitive data. The second integrated circuitry is separated from the first integrated circuitry, the processing unit of the first circuitry transfers sensitive data from the first trust zone to the second trust, the second circuitry transfers sensitive data stored in its persistent memory area to the processing unit of the first trust zone. The first and the second integrated circuitry comprise crypto means for securely transferring sensitive data based on a symmetrical crypto method using a secure key. The second integrated circuitry comprises means for initiating a new key generation to replace the active secure key.

14 Claims, 6 Drawing Sheets

(51) Int. Cl.
*G06F 21/72* (2013.01)
*G06F 21/85* (2013.01)

(56) References Cited

U.S. PATENT DOCUMENTS

| | | | | |
|---|---|---|---|---|
| 8,037,309 | B2* | 10/2011 | Ooi et al. | 713/176 |
| 2004/0092310 | A1* | 5/2004 | Brosnan | G06F 21/606 463/42 |
| 2004/0198494 | A1* | 10/2004 | Nguyen | G07F 17/32 463/42 |
| 2004/0254014 | A1* | 12/2004 | Quraishi | G07F 17/3202 463/29 |
| 2006/0092049 | A1* | 5/2006 | Dellow | 341/50 |
| 2006/0211491 | A1* | 9/2006 | Falvey | G07F 17/32 463/29 |
| 2007/0066398 | A1* | 3/2007 | Rowan | G07F 17/3223 463/42 |
| 2007/0234072 | A1* | 10/2007 | Kudelski | G06F 21/53 713/190 |
| 2008/0005586 | A1* | 1/2008 | Munguia | 713/189 |
| 2008/0019506 | A1* | 1/2008 | Hsu | 380/28 |
| 2008/0240427 | A1* | 10/2008 | Naslund | 380/44 |
| 2008/0274814 | A1* | 11/2008 | Gagner | G07F 17/32 463/43 |
| 2009/0104981 | A1* | 4/2009 | Koyama | A63F 11/00 463/25 |
| 2009/0110195 | A1* | 4/2009 | Paykin | G06F 21/125 380/251 |
| 2009/0239468 | A1* | 9/2009 | He | H04L 63/0853 455/41.2 |
| 2010/0260339 | A1* | 10/2010 | Barson | G06F 21/88 380/283 |
| 2011/0130188 | A1* | 6/2011 | Walker et al. | 463/17 |
| 2011/0191599 | A1* | 8/2011 | Chou et al. | 713/193 |

OTHER PUBLICATIONS (ACM Snapshot).*
European Patent Application No. 10015270.1 filed Dec. 3, 2010 in the name of Novomatic AG, Supplementary Search Report mailed Apr. 5, 2011.
International Patent Application No. PCT/EP2011/006059 filed Dec. 2, 2011 in the name of Novomatic AG, International Search Report maied May 9, 2012.
Schneier, B., "Key Management" *Applied Cryptography: Protocols, Algorithms, and Source Code in C*, pp. 169-187, John Wiley & Sons, New York, NY, US, Jan. 1, 1996.
Menezes, A.J., et al., "Chapter 12: Key Establishment Protocols," Handbook of Applied Cryptography, CRC Press Series on Discrete Mathematics and Its Applications, pp. 489-541, CRC Press, Boca Raton, FL, US, Oct. 1, 1996, retrieved from the Internet: URL: http://www.cacr.math.uwaterloo.ca/hac/.

* cited by examiner

| step | Transaction number (Data) | Key processor | Communication line | Key Memory | Memory |
|---|---|---|---|---|---|
| Power up | - | abc (default) |  | abc (default) | - |
| Key change | - | xyz | axbycz -> | abc | - |
| Key changed | - | xyz | - | xyz | - |
| Data write | 1 | xyz | xy1z -> | xyz | 1 |
| Key change | - | def | xdyezf -> | xyz | 1 |
| Key changed | - | def | - | def | 1 |
| Data read | 1 | def | <- de1f | def | 1 |
| Data write | 2 | def | de2f -> | def | 2 |
| ... | 2 -> 10 | ... | ... | ... | 10 |
| Power Down |  |  |  |  |  |
| Power up |  | abc (default) | - | abc(default) | 10 |
| Hacking |  | (ghi) | axbycz -> | abc | 10 |
| Hacking |  | (ghi) | - | xyz | 10 |
| Hacking |  | (ghi) | xy1z -> | xyz | 1 |
| Hacking |  | (mno) | xdyezf -> | xyz | 1 |
| Hacking |  | (mno) | - | def | 1 |
| Hacking | Invalid Data | mno | <- de1f | def | 1 |
| Hacking |  | (mno) | de2f -> | def | 2 |
| Power Down |  |  |  |  | 2 |
| Power up |  | abc(default) |  | abc(default) | 2 |
|  | ... | ... | ... | ... | ... |

FIG. 2

| step | Transaction number (Data) | Key processor | Communication line | Key Memory | Memory |
|---|---|---|---|---|---|
| Power up | - | abc (default) | - | abc (default) | 10 |
| Key change | - | abc | <- axbycz | xyz | 10 |
| Key changed | - | xyz | - | xyz | 10 |
| Data read | 10 | xyz | <- xy10z | xyz | 10 |
| Data write | 11 | xyz | xy11z -> | xyz | 11 |
| Key change | - | xyz | <- xdyezf | def | 11 |
| Key changed | - | def | - | def | 11 |
| Data read | 11 | def | <- de11f | def | 11 |
| Data write | 12 | def | de12f -> | def | 12 |
| ... | 12 -> 24 | ... | ... | ... | 24 |
| Power Down | | | | | |
| Power up | - | abc (default) | - | abc (default) | 24 |
| Hacking | - | abc | <- axbycz | (ghi) | 24 |
| Hacking | | xyz | - | (ghi) | 24 |
| Hacking | 10 | xyz | <- xy10z | (ghi) | 24 |
| Hacking | 11 | xyz | xy11z -> | ghi | Invalid Data |

FIG. 3

DEVICE FOR AND METHOD OF HANDLING SENSITIVE DATA

CROSS-REFERENCE TO RELATED APPLICATIONS

This application is a continuation of PCT International Patent Application No. PCT/EP2011/006059, filed on Dec. 2, 2011 which claims benefit of priority to European Patent Application No. 10015270.1, filed Dec. 3, 2010, the contents of which are incorporated herein by reference in its entirety.

BACKGROUND OF THE INVENTION

The present invention relates to a device for handling sensitive data and a method for securely transferring sensitive data between at least one processing unit and a memory device. The invention further relates to an integrated circuitry with an integrated memory area for securely storing sensitive data. Moreover, the invention is directed to a gambling machine processing sensitive data.

Data security is an important issue for many aspects of business, particularly as it relates to stored proprietary or confidential data. For example, computer program source code stored in flash memory (or other form of electronic memory) can be valuable proprietary information. Another example of proprietary information may be book keeping data of a gambling machine.

For example, a microprocessor system may be implemented as a system on a chip (SOC) which comprises a processor that accesses both on-chip and off-chip memory. Secure computation can be achieved if the software is secure and the associated instructions and data remain entirely on-chip and are not exposed to external view. But once data is transferred off-chip, it becomes vulnerable to attack and the security of a given computation may be compromised. For example, an attacker could obtain access to an unprotected off-chip memory and examine the stored data, possibly detecting secret information. The attacker could even modify the stored data and thereby subvert an otherwise secure computation.

To avoid unauthorized access and/or manipulation of data stored in an external memory, the data may be handled according to a cryptographic method.

Cryptographic method and systems may be used to protect state information in a personal communication device by securely storing the state information in a couple of ways. One way may be by writing a snapshot to the state information and computing its checksum, e.g. by using a one-way hash function. The result is stored within a tamper-resistant memory location of the device. Therefore, if someone tries to change the state information, the checksum of the result will not match the checksum value stored within the personal device. Another way may be by using a monotonic, persistent counter within the device, every time there is a state change, the state information is stored along with the current counter value encrypted using a device key. Thus, it may not be possible to change the encrypted state information without the key.

US2003/0079122 A1 discloses the idea of using an external tamper-resistant storage device to store important state information. The idea of authenticated counters is introduced. The said patent application US 2003/0079122 A1 discloses that an authenticated counter can be implemented in an external tamper-resistant security token, such as a smartcard, which can be used by the secure processor to integrity-protect its state storage. To make this work, the secure processor needs to be able to authenticate the external security token. For this purpose, the patent application US 2003/0079122 A1 discloses using a public key infrastructure (PKI).

However, a public key infrastructure is rather complex to set up because it involves coordination and agreements between device manufacturers and manufacturers of external security tokens. It also imposes an amount of processing load onto the external security tokens or memories.

State of the art gambling machines are working with money. Therefore, a security system is necessary which should make it impossible to manipulate book keeping data for personal advantage. The security system should prevent an influence to the gambling process which harms providers of gambling machines.

Book keeping data should be stored in an external non-volatile or battery back-uped memory due to the fact that after an unexpected power down of the system the gambler wants to keep his booked money on his gambling account and does not want to lose it. To avoid that anyone can read stored data in that external memory and manipulate its content, cryptographic method devices as stated above are implemented in gambling machines for essentially protecting memory content. However, none of the introduced devices and methods achieves satisfying results for protecting sensitive data in gambling machines.

Document U.S. Pat. No. 6,209,098 discloses a circuitry implemented within a multi-chip module comprising a first integrated circuit chip and a second integrated circuit chip coupled together through an interconnect. Both the first and second integrated circuit chips include a cryptographic engine coupled to the interconnect and a non-volatile memory element used to contain key information. These cryptographic engines are solely used to encrypt outgoing information being output across the interconnect or to decrypt incoming information received from the interconnect. This is provided so as to prevent fraudulent physical attack of information transmitted across the interconnect.

There is a need to provide for improved data security of stored data by addressing or advancing one or more shortcomings or disadvantages associated with the conventional security techniques, or to at least provide a useful alternative to such conventional security techniques.

BRIEF SUMMARY OF THE INVENTION

It is a first object of the present invention to provide a device for handling sensitive data which obviates the drawbacks described above.

It is a second object of the present invention to provide a method for securely transferring data between a processing unit and a memory device.

A third object of the present invention is to enhance a memory device for being capable of securely transferring data to an arbitrary connected device.

A fourth object of the present invention is to provide a gambling machine with increased safety standards for handling sensitive data within the machine.

The present invention provides for an integrated circuitry for secure data exchange as defined in claim 1, a device for handling sensitive data according to claim 2, a method for securely transferring sensitive data according to claim 8 and a gambling machine as defined in claim 13. Preferred embodiments of the invention are laid down in the dependenct claims.

Accordingly, the device comprises at least one first integrated circuitry for forming a first trust zone and a second integrated circuitry for forming a second trust zone wherein:

a) the first integrated circuitry comprises at least one secure processing unit adapted for processing sensitive data,
b) the second integrated circuitry comprises at least one persistent memory area within its trust zone for storing the sensitive data wherein the second integrated circuitry is separated from the first integrated circuitry,
c) the processing unit of the first integrated circuitry is adapted to transfer the sensitive data from the first trust zone to the second trust zone for securely storing said data in the persistent memory area of the second trust zone,
d) the second integrated circuitry is adapted to transfer the sensitive data stored in its persistent memory area to the processing unit of the first trust zone,
e) wherein the first and the second integrated circuitry comprise crypto means for securely transferring the sensitive data based on a symmetrical crypto method using a secure key, and
f) wherein the second integrated circuitry comprises means for initiating a new key generation to replace the active secure key.

The first and the second integrated circuitries form a trust zone each allowing only restricted access in a secure manner. The first and second integrated circuitries are interconnected over a bidirectional communication link. Both first and second integrated circuitries use the same active secure key for de-/encrypting the transferred data over the communication link. In case a generation of a new key is initiated by the second integrated device, i.e. the device that keeps the secret, data, the active key is replaced by the new generated key at both side of the communication link, that is to say at the first and second circuitry. After successful key exchange the newly generated key will become the current active key.

Since key generation is initiated and processed at the second integrated circuitry an absolutely safe system is guaranteed. The inventive device is bearing up towards a hacking method which tracks the communication between first integrated circuitry and second integrated circuitry after power up and restores the last state of the memory area of the second integrated circuitry with the tracked data after another power up.

In contrast to the prior art, the persistent memory area may not only be used for storing data placed therein at manufacture, but may be adapted to store data received from connected devices during operation of the device. In particular, the persistent memory may store sensitive data received through the data transfer means from a connectable, separate device. One and the same integrated circuit may include a memory area for storing sensitive data received from an external, connectable device, means for receiving and sending the sensitive data, crypto means for de/encrypting received/stored data and means for initiating generation of a new secure key after power up in order to replace the active secure key.

Preferably, more than one first integrated circuitry can be interconnected with the second integrated circuitry each adapted identically to act as described above. All first integrated circuitries and the second integrated circuitry use the same secure key for de-/encryption.

In a preferred embodiment of the invention the crypto means are adapted to securely transfer a new generated key from the second integrated circuitry to the first integrated circuitry. That is, a newly generated key is encrypted with the active secure key before being transmitted. Therefore, a tracked key is unreadable without the current active key.

It is advantageous that the first and second integrated circuitry comprise a secret one-time programmable power-on key. The power-on key is used to securely transfer a new key generated by the second integrated circuitry after power up from the second integrated circuitry to the first integrated circuitry. Without said power-on key a key exchange in plain text after power up would be necessary to provide an initial secure key for both sides. A key transmission in plain text allegorizes a serious security problem since the key could be easily tracked and used for adjacent data transfers. Said risk is avoided by the preferred use of a power-up key.

It is advantageous that the power-up key is comparatively large, e.g. a 128 bits long key. However, the length of the key may be even larger, e.g. two times, three times or x times of bits may be used for the key. The key is preferably stored at the first and second integrated circuitry in a mechanically insusceptible non-volatile memory. It is further preferable to adapt the power-up key being programmable. Consequently, a manual change of the power-up key is possible from time to time.

It is conceivable that the one-time programmable power-on key accessed by the second integrated circuitry is stored in its persistent memory area. The persistent memory area is mechanically insusceptible being sufficiently protected against physical hacking attacks trying to get access to said memory area.

In another preferred embodiment of the invention the means for initiating a new key generation are adapted to initiate a new key generation after each transfer of sensitive data from the first integrated circuitry to the second integrated circuitry. Consequently, a data packet containing sensitive data which is written into the memory area of second integrated circuitry will look different when it is read by the first integrated circuitry from said memory area.

Alternatively or additionally it can be conceivable to initiate a new key generation after each transfer of sensitive data from the second integrated circuitry to the first integrated circuitry or after each transfer of sensitive data in both directions.

To provide a random generated key which is hardly to estimate by a hacker it is further preferable that the means for initiating a new key generation comprise at least one random number generator for generating a key on the basis of a random number.

In a preferred embodiment the persistent memory area of the second integrated circuitry is a tamper-resistant non-volatile or a tamper-resistant battery back-uped memory. Both embodiments provide a possibility of data storing which will be kept during a power-down event. Therefore, both stored sensitive data and power-up key are immediately available after a device restart.

The second object of the invention is solved by a method for securely transferring data between at least one processing unit and a memory device according to claim 8. According to the invention the method comprises the step of de-/encrypting based on a secure key. A symmetrical crypto engine is used, that is the same secure key is used at the processing unit and at the memory device. Further sensitive data is transferred in encrypted form. Sensitive data is encrypted based on the secure key at the processing unit, decrypted at the receiving memory device and stored in the secure memory area. In case the processing unit is instructed to read sensitive data from the memory device, the data is encrypted at the memory device based on the secure key, transferred to the processing unit and decrypted for further processing with the help of the secure key.

Further, according to the invention, the memory device initiates and generates a new key for replacing the current active secure key. The essential advantage of the inventive method is that the memory always defines the active key. For example an attacker could try to access a memory device by simulating a manipulated secure key and therefore would be able to write arbitrary data content to the memory device. According to the invention, defining the active key by the memory device will protect the device towards such attacking methods.

It is very conceivable that the key exchange of a new generated key is de-/encrypted by the current active secure key. That is, a new generated key is encrypted by the memory device based on the current active key and transmitted to the processing unit. The processing unit decrypts the received encrypted new key with help of the current active key. After the successful key transmission the current active key is replaced by the new generated key now becoming the current active key used for adjacent data transmission.

Preferable, a secret one-time programmable power-on key is used as an initial secure key for en-decrypting a first key exchange from the memory device to the processing unit after power up. This avoids a key exchange in plain text after power-up to ensure identical secure keys on both sides, i.e. processing unit and memory device.

In a preferred embodiment of the invention a key generation and/or key exchange is initiated by the memory device after each data transfer of sensitive data from the processing unit to the memory device. Consequently, after each writing operation to the memory device, a key exchange is initiated. A data packet written to the memory device will look different when transmitted from the memory device to the processing unit due to different active keys.

The inventive method is advantageously processed by the inventive device according to any of claims 1 to 7. Obviously, the method has the same advantages and properties as stated above by the description part relating to the device according to any of claims 1 to 7.

The invention is further directed to a circuitry according to claim 13. The integrated circuitry for secure data exchange comprises a persistent memory area, in particular a non-volatile memory, for storing sensitive data comprising data transfer means for receiving sensitive data to be stored in the persistent memory area from at least one connected device and for sending sensitive data stored in the persistent memory area to at least one connected device, crypto means for de-/encrypting received/stored sensitive data based on a symmetrical crypto method using a secure key, and means for initiating a generation of a new key to replace an active secure key. The circuitry is configured to use a single cryptographic primitive.

The logic and/or the means of cryptography may be implemented by hardware, software or a combination of hardware and software.

According to a preferred embodiment the circuitry is of the type according to the second integrated circuitry of the inventive device for handling sensitive data. Further, the circuitry is adapted to perform the method according to any of claims 8 to 12. The preferred advantages and property of the circuitry are obviously identical to the above explanations. Therefore, a repeated description appears to be unessential.

Lastly, the present invention is related to a gambling machine comprising a device or a circuitry according to one of the above mentioned embodiments. The gambling machine deals with a variety of sensitive data that needs to be protected towards hacking attacks. Sensitive data which are worth of protection mechanism preferably refers to at least one of book keeping, data, money balance, profit margin, number of games, number of won games, transaction numbers, etc. . . . . Therefore, sensitive data is protected by the device according to any of claims 1 to 7 and/or the method according to any of claims 7 to 12 and/or the integrated circuitry for handling sensitive data according to claims 13, 14.

In a particular embodiment of the present invention the processing unit of the first integrated circuitry is adapted to control the gambling machine and the sensitive data stored in the memory area of the second integrated circuitry include at least one transaction number that is used by the processing unit to validate book keeping data. Book keeping data is preferably stored in an additional memory device/area. Alternatively it could be stored to the memory integrated in the second integrated circuitry.

It is particularly preferable that the transaction number characterises the number of processed money/book keeping data transactions within the gambling machine. The transaction number is automatically incremented, after each transaction.

In this context it is conceivable that the processing unit comprises at least one transaction number generator for generating a transaction number after each game or an event which leads to a change of game related information. Instead of incrementing the transaction number a transaction number that is randomly generated may be used.

BRIEF DESCRIPTION OF THE SEVERAL VIEWS OF THE DRAWINGS

The invention will be described in greater detail hereinafter, by way of non-limiting example, with reference to the embodiments shown in the drawings.

FIG. 2: a first table displaying a possible hacking scenario, FIG. 3: a second table displaying another hacking scenario.

DETAILED DESCRIPTION OF THE INVENTION

Figure 1:
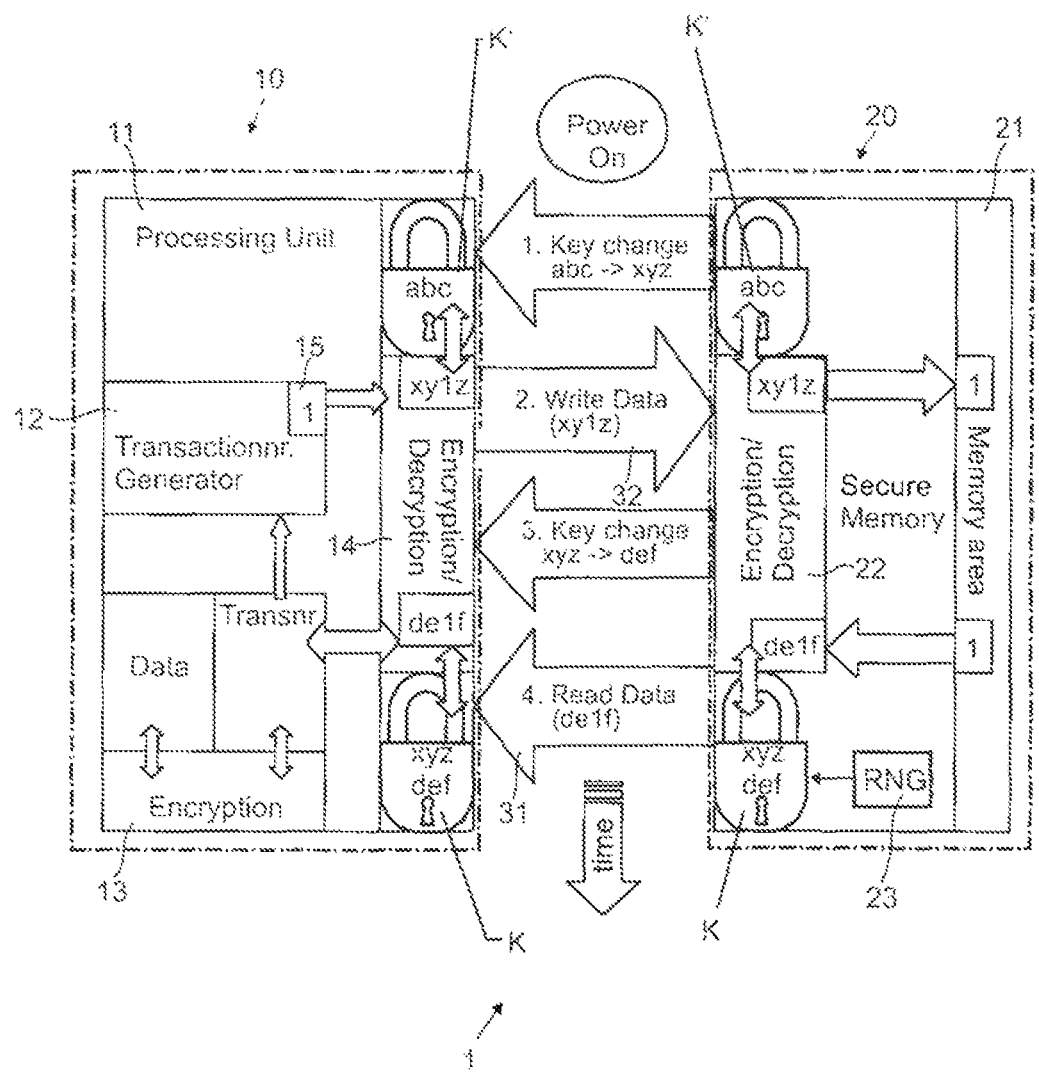
FIG. 1: a schematic representation of the inventive device for handling sensitive data

Gambling machines are working with money. This requires a security system which should make it impossible to manipulate book keeping data for personal advantage. The security system should prevent an influence to the gambling process which harms providers of gambling machines. Book keeping data should be stored in an external non-volatile or battery back-uped memory due to the fact that after an unexpected power down of the system the gambler wants to keep his booked money on his gambling account and does not want to lose it.

To avoid that anyone can read stored data in that external memory and manipulate its content, a symmetrical encryption engine is essential which makes the content of the memory unreadable to anyone who doesn't know the encryption algorithm and the encryption key. Consequently, it is impossible to manipulate actively the book keeping data without that information.

Active hacking attacks mean to fill the external memory with own corrupted data. Because without knowledge of the encryption system and the encryption key the processing unit will not understand the corrupted data. But a security hole still exists in this system by passive manipulation of the memory.

As mentioned above, the current system is susceptible to passive tracking of encrypted data. Even without knowledge of the meaning of the encrypted data it is possible to corrupt the book keeping memory data by playing back a valid state of the past into the memory. This data, which is correctly encrypted data, can be decrypted by the processing unit. This allows the following manipulation scenario. Someone inserts money into a gambling machine and tracks the state of all encrypted external memories. This may be done by either tracking the data transfer or reading, out the memory content if this is possible. After losing the money through gambling it may be possible to play back the previous state by replacing the encrypted contents of all external memories with the tracked data. This may restore the lost credits and the person may go on gambling without inserting sonic extra money.

To prevent such a manipulation of gambling data some validation information is added to the encrypted data which will tell, if the encrypted data is valid or non valid. Therefore, a transaction number may be created as the validation information, which changes every game and is attached and encrypted together with the book keeping data, if someone makes a snapshot of the system it is useless because the processing unit will notice that the data is "old", i.e. belongs to a previous state, and is currently not valid anymore. This system would be untouchable, i.e. prone to attacks, if the CPU would have a non-volatile memory inside, which may keep the transaction number after a power down. A non-volatile memory inside the processing unit would be unapproachable and defended from hacking attacks.

However, due to the fact that a non-volatile internal memory, i.e. in the processing unit is hardly to be realised in cost effective manner, an external memory may be required to keep the transaction number. This external memory may fulfil a couple of security features such that nobody may track and corrupt this data. These requirements may easily be fulfilled by the device, method or integrated circuitry according to the present invention.

FIG. 1 shows schematic view of the inventive device 1 for handling sensitive data as the above mentioned transaction number. A shared key K is used to secure the communication between a primary ASIC 10, which comprises a processing unit 11, and the secondary ASIC 20, which comprises a insusceptible, non-volatile memory area 21.

The primary ASIC 10 further comprises a transaction number generator 12 and an encryption module 13. A new transaction number is created by the transaction number generator 12 each time the game program, which is operated by means of the ASIC 10, changes or a relevant event occurs. The transaction number is attached and encrypted together with the book keeping data 15 by the encryption module 13. The encrypted data packet is stored in a connected storage device. To maintain the current valid transaction number during a power down of the device/gambling machine the transaction number advantageously is transmitted to the second ASIC 20 for storing it into non-volatile memory area 21. It is an advantageous aspect that the measures provided according to the invention may enable the non-volatile memory area 21 to be comparatively small.

Commands Read 31 and Write 32 belong to a protocol 30 to be used between the ASICs 10, 20 and are used to write the transaction number on the persistent memory area 21 of the secondary ASIC 20 and to read the transaction number from the persistent memory area 21. Each transmission between both ASICs 10, 20 is secured by symmetric key cryptographic algorithms executed by the de-/encryption engines 14, 22 of the respective ASICs 10, 20. In detail, in the present example a symmetric DES algorithm is used based on a dedicated shared key K. The primary ASIC 10 may send protocol commands to the secondary ASIC 20 and the secondary ASIC 20 responds to the primary ASIC 10 by sending responses to the commands.

Further, the device 1 in the present example comprises and works with a secret one-time programmable power-on key K', which is used by both engines 14, 22 as an initial starting secure key. Said power-on key K' is programmed into the processing unit 11 and into the memory area 21 and accessible by the respective engines 14, 22. This key K' is used as a current active key to exchange a new generated key K for the following data transfer after power up. After successfully transmitting a newly generated key K to ASIC 10 the power-on key K' as the active key for en-/decryption is replaced by the new generated key K which becomes now the current active key K.

This key K may be changed after each data transfer. Alternatively the key K may be changed after a number of data transfer actions have been performed. Consequently, a data packet which is written into the secure memory will look different when it is read by the processing unit. Advantageously a large key of for instance 128 bit may be used.

According to an advantageous aspect of the invention the key change is initiated by the ASIC 20, i.e. the second trust zone that is adapted for storing the sensitive data within the persistent memory area 21. Key generating in the present example is based on a random number generator 23 integrated in ASIC 20 and connected to engine 22 for providing a new generated secure key K.

The importance of an advantageous aspect of the present invention, i.e. that a key change is initiated by ASIC 20, will be explained by the two following scenarios represented by the tables shown in FIGS. 2 and 3.

FIG. 2 shows an embodiment where the generation of a new key is initiated by ASIC 10, i.e. the first trust zone. In line 1 of the table shown a "Power-up" event occurs and both de-/encryption engines 14, 22 of ASICs 10, 20 start with the power-on key which is "abc". In the next step, line 2, "Key change" ASIC 10 initiates the generation of a new key "xyz" and transmits the key "xyz" encrypted with key "abc" to ASIC 20, in particular to engine 22. Step "Key changed" stands for a successful key exchange wherein power-on key "abc" is replaced by new key "xyz"

In line 4, step "Data write", a new transaction number "1" is generated by generator 12 of ASIC 10, which transaction number is intended to be stored in memory area 21 of ASIC 20. Therefore, the number "1" is transmitted to ASIC 20 encrypted with key "xyz" and stored in memory (last column of the table shown in FIG. 2). Data transmission initiates at ASIC 10 generation of new key "def", which new key "def" is exchanged according to aforementioned steps "Key Change" and "Key Changed". On contrary, the step "Data read" does not initiate a key change.

Until the first power-down event in the table a transaction number "10" is stored in the memory area 21. A hacker may capture the communication sequence 200 between ASICS 10, 20 beginning at the first power-up event.

When the device is restarted (second power-up event in line 11) the tracked sequence 200 could be used to restore the memory area 21 with the respective transaction number of the previously tracked communication sequence. Since the key generation was initiated by ASIC 10, the ASIC 20 will act according to the captured communication sequence 200. ASIC 20 will see valid data because the first key change is acceptable whereby the memory area 21 can be restored with the invalid transaction number "2".

However, since ASIC 10 uses a new generated key "ghi" after the second power-up event, which new generated key "ghi" does not match to the old key "xyz" of captured communication sequence 200, the transmitted transaction number "2" can not be encrypted by engine 14 of ASIC 10. This will lead to an "invalid data" status in the processing unit 11. Unfortunately, said invalid status will be corrected by a third power up since both engines 14, 22 will start once again with power-up key "abc". The memory area 21 of ASIC 20 will see valid data, in particular a valid transaction.

A key change initiated by the ASIC 20 can prevent such a hacking attack as can be seen in the table of FIG. 3. The first communication sequence 300 between ASICs 10, 20 is similar to FIG. 2, however, a key exchange, depicted in steps "Key change" and "Key changed" is initiated by ASIC 20. As indicated by a processing sequence 300 a transaction number "24" is stored in memory area 21 of ASIC 20.

If a tracked processing sequence 300 is intended to be used to restore data content of memory area 21, such an attempt will fail to access to the memory area 21. A new key "ghi" is immediately generated by ASIC 10 after the second power-up event. Therefore, engine 22 of ASIC 20 can not encrypt the old data content of sequence 300 which is brought in an attack attempt into the communication line between ASIC 10, 20. Content of memory area 21 will remain untouched or lead to an "Invalid Data" event.

Figure 4:
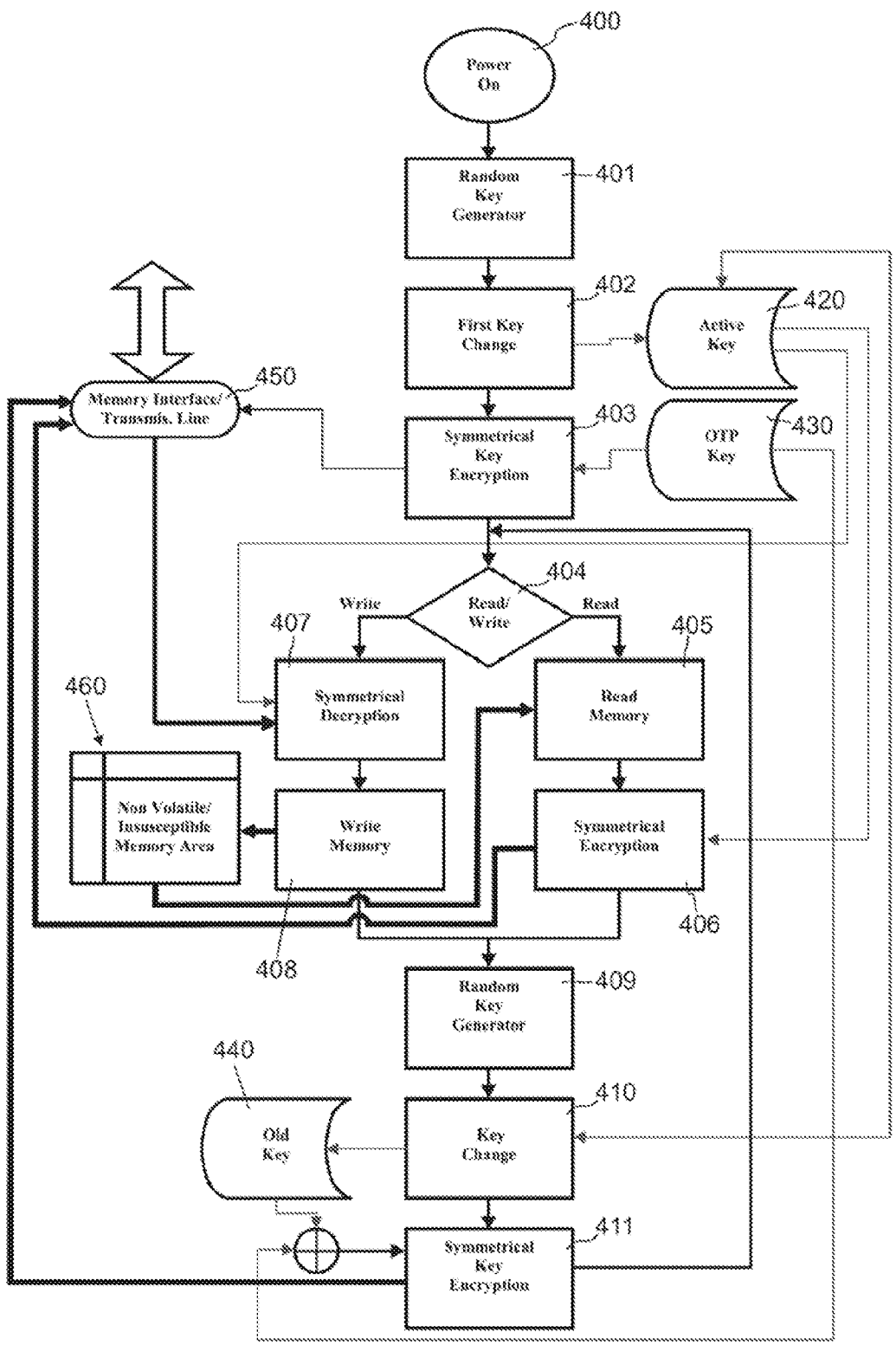
FIG. 4: a first flow chart depicting a first implementation of the inventive method.
Figure 5:
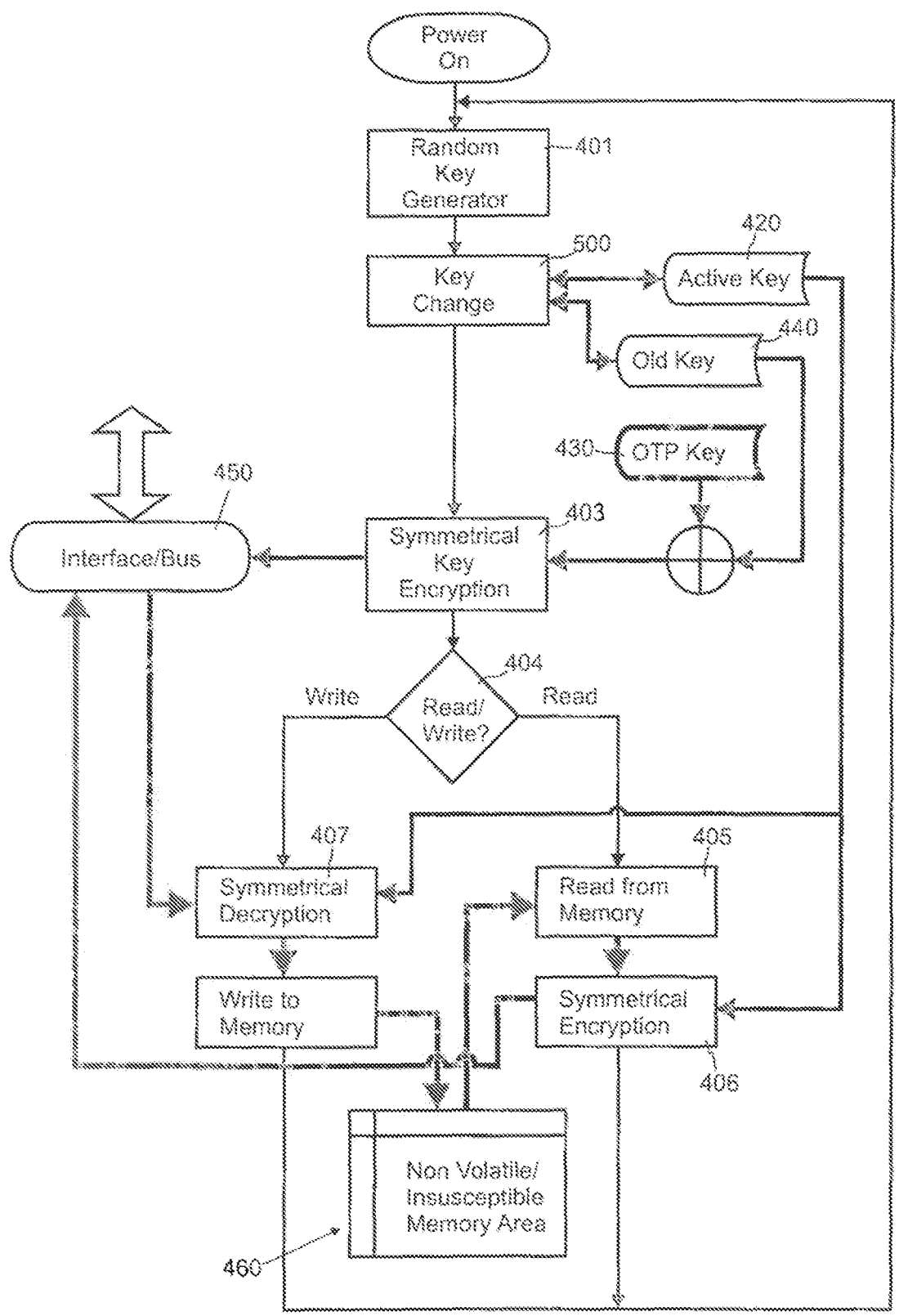
FIG. 5: a second flow chart depicting a second implementation of the inventive method.

FIGS. 4 and 5 show differing flow charts indicating two possible implementation algorithms of the inventive method that may be executed at ASIC 20 by means of a state machine procedure.

After a "Power-On" event, step 400, a random key will be generated according to a step 401. According to a subsequent step "First Key Change" 402 the new key is stored in a memory cell 420 and delivered to a module "Symmetrical Key Encryption" 403. Module 403 is operatable to encrypt the new key using the current active key, which is at that time the power-on key and transmits the encrypted data over a memory interface 450.

The state machine now remains in a step "Read/Write" 404, waiting for a Read/Write command to be executed. If a Read command is executed, then according to a step "Read memory" 405 the current data content (transaction number) will be fetched from a memory area 460 followed by encrypting the data content according to a step "Symmetrical Encryption" 406 by using the key stored in cell "Active Key" 420, and transmitting the encrypted content over an interface 450 to the primary ASIC 10.

If a Write command is executed, then according to step "Symmetrical Decryption" 407 the received encrypted data, which was received over Memory interface 450, will be decrypted by using the key stored in cell "Active Key" 420. Decrypted data (transaction number) will then be stored according to step "Write memory" 408 to memory area 460.

After each Read/Write command a new key is generated according to a step "Random Key Generator" 409. According to a step "Key Change" 410 the newly generated key is stored in the memory cell 420 and the previous new key is stored in cell "Old key" 440. According to a subsequent step "Symmetrical Key Encryption" 411 the newly generated key is encrypted based on either the previous new key stored in cell "Old key" 440 or the key that is stored in cell "OTP key" 430. The encrypted key data is transmitted over memory interface 450. If the cell "Old key" 440 is empty, the system may use the power-up key stored in cell "OTP key" 430 for the en-/decryption procedure. In the following, the state machine jumps to step 404, waiting for a new Read/Write command.

FIG. 5 shows another flow chart which suggests a slightly differing implemented algorithm of the present invention. Contrary to the steps shown in FIG. 4, depicted flow chart is based on a recursive method using only one step "Key change" 500. Further, the logic which monitors if a new key has already been generated is also implemented by using the single module "Key Change" 500 at the beginning of the flow chart. Both implementations (FIG. 4, 5) will perform identical functions according to the inventive method. However, the coding effort and complexity may be reduced by using implementation form according to FIG. 5.

Figure 6:
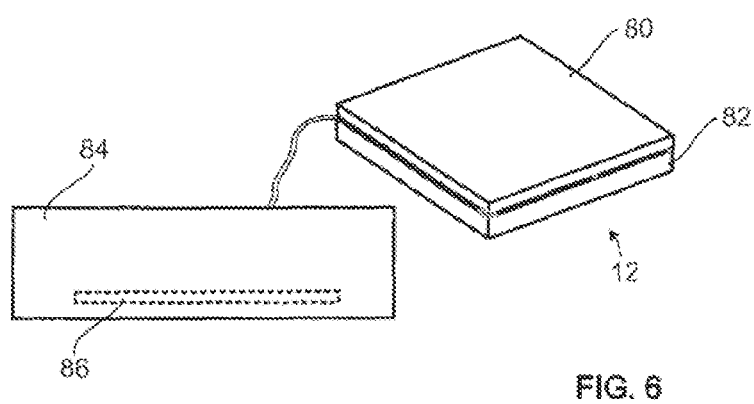
FIG. 6: a perspective side view of a gambling machine according to the present invention.

FIG. 6 shows a preferred embodiment of a gambling machine with an integrated device according to present invention. FIG. 6 shows a computer 84, which mounts in the housing and connects with a display interface 80 that may include a touch-screen. The computer includes a main board 86 having a controller, memory connected to the main board for storing software, software stored in the memory for operating the interface 80, software drivers, and a main processor.

Figure 7:
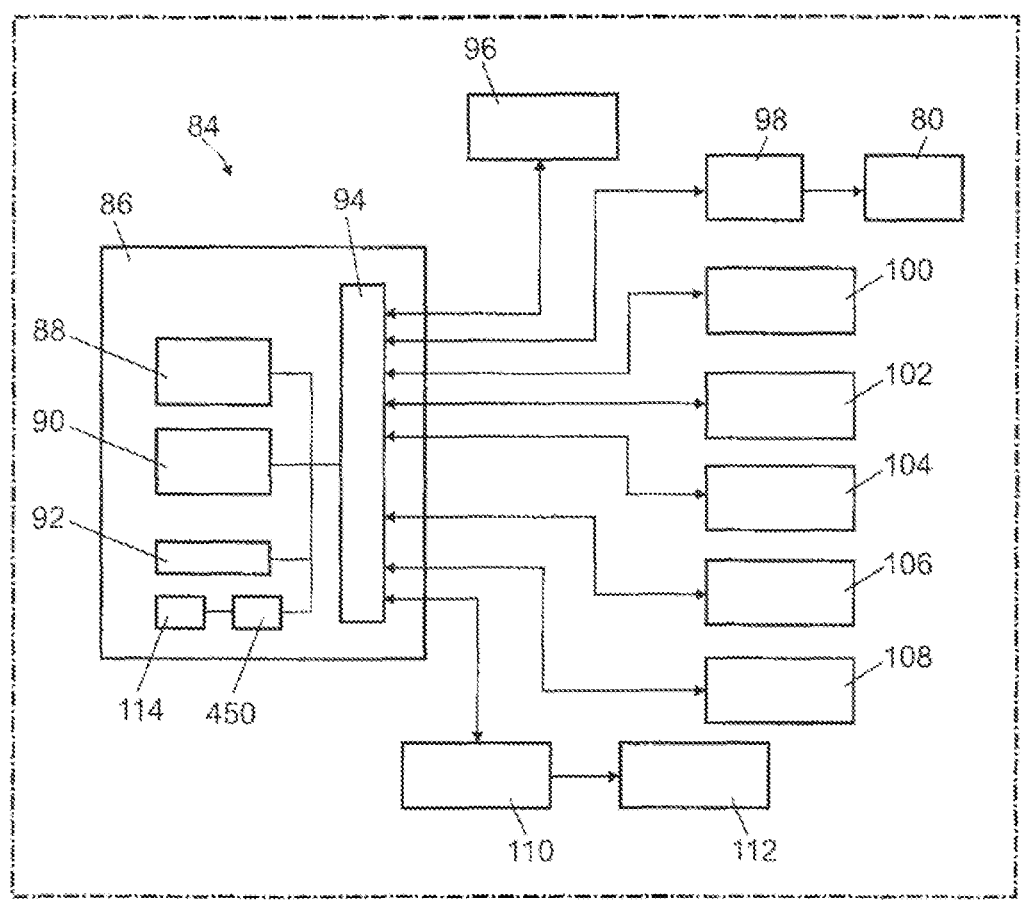
FIG. 7: a system diagram according to the gambling machine in FIG. 6.

FIG. 7 shows a system diagram of the computer 84. The main board 86 comprises program memory 88 being a computer readable medium, a main processing unit 90 and RAM 92 connected in operative communication. The relationship between processing unit 90 and external memory device 114 refers to the present invention, wherein the memory device 114 and the processing unit 90 are coupled to each other via interface 450. The aforementioned transaction number is stored at memory device 114. It may be mentioned that the interface 450 may be wired or alternatively wireless, in which case means for wireless transmission may be comprised.

The computer 84 further comprises an input output I/O controller 94. The I/O controller 94 communicates with a control panel 96, a display interface driver 98, a display unit 100, a coin acceptor 102, a bill acceptor 104, a card reader 106, a ticket reader/printer 108, and a sound circuit 110. The sound circuit 110 is in operative communication with speakers 112.

The coin acceptor 102 and the bill acceptor 104 accept currency and communicate the amount accepted to the I/O controller 94. The card reader 106 reads credit cards, debit cards, gift cards or other cards having electronic indicia of monetary value.

The ticket reader 108 prints tickets and receipts revealing the winnings of a player, or other financial, outcome. The ticket reader 108 also receives tickets having indicia of monetary value.

The sound circuit 110 is configured to provide an acoustic-based interface for the user. Each movement or action by a user may result in a particular sound, or instruction being generated by the computer 84. The speakers 112 emit the sounds to the user.

It will be readily apparent to one of ordinary skill in the art that the various processes described herein may be implemented by, e.g. appropriately programmed general purpose computers, special purpose computers and computing devices. Typically a processor, e.g. one or more microprocessors, one or more microcontrollers, one or more digital signal processors will receive instructions, e.g. from a memory or like device, and execute those instructions, thereby performing one or more processes defined by those instructions.

A "processor" means one or more microprocessors, central processing units CPUs, computing devices, microcontrollers, digital signal processors, or like devices or any combination thereof.

We claim:

1. An integrated circuitry to securely exchange data with another integrated circuitry, comprising:
   a persistent memory area to store sensitive data;
   a data transferer to receive the sensitive data from a trust zone of the other integrated circuitry, wherein said persistent memory area is adapted to store the sensitive data received through said data transferer, and wherein said data transferer is adapted to send the sensitive data stored in the persistent memory area to the trust zone of the other integrated circuitry;
   a cryptographic engine to decrypt the sensitive data received from the other integrated circuitry and encrypt the sensitive data to be sent and stored in the persistent memory area based on a symmetrical crypto method using an active secure key;
   wherein the integrated circuitry is separated from the other integrated circuitry, and
   wherein a trust zone separate from the trust zone of the other integrated circuitry is formed by the integrated circuitry, the said trust zone of the integrated circuitry comprising a key generator to generate a new secure key after power up in order to replace the active secure key.

2. A device to handle sensitive data comprising at least one first integrated circuitry to form a first trust zone and at least one second integrated circuitry to form a second trust zone, wherein the second integrated circuitry comprises:
   a persistent memory area located within said second trust zone to store the sensitive data;
   a second data transferer to receive sensitive data from the at least one first integrated circuitry, wherein said persistent memory area is adapted to store the sensitive data received through said second data transferer, and wherein said second data transferer is adapted to send the sensitive data stored in the persistent memory area to the at least one first integrated circuitry;
   a second cryptographic engine to decrypt the sensitive data received from the at least one first integrated circuitry and encrypt the sensitive data stored in the persistent memory area based on a symmetrical crypto method using an active secure key; and
   a second key generator to initiate a generation of a new secure key after power up to replace the active secure key,
   wherein the first integrated circuitry comprises at least one secure processing unit adapted to process the sensitive data, wherein the first integrated circuitry is separated from the second integrated circuitry,
   and wherein the secure processing unit of the first integrated circuitry is adapted to transfer the sensitive data from the first trust zone to the second trust zone to securely store said sensitive data in the persistent memory area of the second trust zone,
   and wherein the second integrated circuitry is adapted to transfer the sensitive data stored in the persistent memory area to the secure processing unit of the first trust zone, and
   wherein the first integrated circuitry comprises a first cryptographic engine to securely transfer the sensitive data based on the symmetrical crypto method using the active secure key which is replaceable by the new secure key generated by the second integrated circuitry after power up.

3. The device according to claim 2, wherein the second cryptographic engine is used to securely transfer a new generated key from the second integrated circuitry to the first integrated circuitry.

4. The device according to claim 2, wherein the first and second integrated circuitries comprise a secret one-time programmable power-on key, said power-on key being used to securely transfer, from the second integrated circuitry to the first integrated circuitry, the said new secure key generated by the second integrated circuitry after power up, wherein the one-time programmable power-on key in the second integrated circuitry is stored in the persistent memory area of the second integrated circuitry.

5. The device according to claim 2, wherein the first integrated circuitry comprises a first key generator.

6. The device according to claim 2, wherein the second key generator is adapted to initiate a new secure key generation after each transfer of the sensitive data from at least one of the first integrated circuitry to the second integrated circuitry and/or after each transfer of the sensitive data from the second integrated circuitry to the first integrated circuitry.

7. The device according to claim 2, wherein the second key generator of the second integrated circuitry comprises a random number generator to generate a secure key on the basis of a random number.

8. The device according to claim 2, wherein the persistent memory area of the second integrated circuitry is a tamper-resistant non-volatile or a tamper-resistant battery back-uped memory.

9. A method to securely transfer sensitive data bidirectionally between at least one first integrated circuitry and at least one second integrated circuitry,
   wherein the first integrated circuitry is separated from the second integrated circuitry,
   wherein at least one processing unit of the first integrated circuitry is adapted to process the sensitive data and to transfer the sensitive data from a first trust zone of the first integrated circuitry to a trust zone of the second integrated circuitry separate from the first trust zone,
   wherein the second integrated circuitry is adapted to transfer the sensitive data stored in the persistent memory device of the second integrated circuitry to the at least one processing unit of the first integrated circuitry,
   wherein the first integrated circuitry comprises a first cryptographic engine to securely transfer the sensitive data based on a symmetrical crypto method using an active secure key which is replaceable by a new secure key, the method comprising:
   storing the sensitive data received from at least one processing unit of the first integrated circuitry to a persistent memory device of the second integrated circuitry, wherein the persistent memory device is adapted to store the sensitive data received through a data transferer of the second integrated circuitry;
   decrypting, by a cryptographic engine of the second integrated circuitry, the sensitive data received from the at least one processing unit of the first integrated circuitry using an active secure key;
   encrypting, by the cryptographic engine of the second integrated circuitry, the sensitive data to be sent and being stored in the persistent memory device of the second integrated circuitry using the active secure key; and
   generating, by a key generator of the second integrated circuitry, a new secure key after power up and replacing the active secure key by the new secure key.

10. The method according to claim 9, further comprising decrypting and encrypting a key exchange of the new secure key from the persistent memory device to the at least one processing unit using the active secure key.

11. The method according to claim 9, further comprising decrypting and encrypting a key exchange from the persistent memory device to the at least one processing unit after power up using a secret one-time programmable power-on key used as an initial secure key.

12. The method according to claim 9, further comprising generating the new secure key or initiating a key exchange using the persistent memory device after each data transfer of the sensitive data from the at least one processing unit to the persistent memory device and/or from the persistent memory device to the at least one processing unit.

13. A gambling machine, comprising at least one first integrated circuitry to form a first trust zone and at least one second integrated circuitry to form a second trust zone, said second integrated circuitry comprising:
   a persistent memory area located within said second trust zone to store the sensitive data;
   a second data transferer to receive sensitive data from the at least one first integrated circuitry, wherein said persistent memory area is adapted to store the sensitive data received through said second data transferer, and wherein said second data transferer is adapted to send the sensitive data stored in the persistent memory area to the at least one first integrated circuitry;
   a second cryptographic engine to decrypt the sensitive data received from the at least one first integrated circuitry and encrypt the sensitive data stored in the persistent memory area based on a symmetrical crypto method using an active secure key; and
   a second key generator to initiate a generation of a new secure key after power up to replace the active secure key; wherein
   the first integrated circuitry comprises at least one secure processing unit adapted to process the sensitive data, wherein the first integrated circuitry is separated from the second integrated circuitry;
   the processing unit of the first integrated circuitry is adapted to transfer the sensitive data from the first trust zone to the second trust zone to securely store said sensitive data in the persistent memory area of the second trust zone;
   the second integrated circuitry is adapted to transfer the sensitive data stored in the persistent memory area to the processing unit of the first trust zone; and
   wherein the first integrated circuitry comprises a first cryptographic engine to securely transfer the sensitive data based on the symmetrical crypto method using the active secure key which is replaceable by the new secure key generated by the second integrated circuitry after power up.

14. The gambling machine according to claim 13, wherein the processing unit of the first integrated circuitry is configured to control the gambling machine, and the sensitive data stored in the persistent memory area of the second integrated circuitry include at least one transaction number which is used by the processing unit to validate book keeping data, wherein the processing unit comprises a transaction number generator for generating a transaction number after each game or an event which leads to a change of game related information.

* * * * *